Aug. 24, 1926.

A. BARTHEL 1,597,041

INTERNAL COMBUSTION ENGINE WITH IGNITION CHAMBER

Filed August 5, 1925

Witnesses:

Inventor:
Alfred Barthel

Patented Aug. 24, 1926.

1,597,041

UNITED STATES PATENT OFFICE.

ALFRED BARTHEL, OF FRIEDRICHSFELD-NORD, GERMANY, ASSIGNOR TO MOTORENWERKE MANNHEIM A. G., VORM. BENZ ABT. STATIONARER MOTORENBAU, OF MANNHEIM, GERMANY.

INTERNAL-COMBUSTION ENGINE WITH IGNITION CHAMBER.

Application filed August 5, 1925, Serial No. 48,328, and in Germany September 26, 1923.

In order to attain an entire combustion, ignition-chamber engines, working with airless fuel injection, require a certain determined volume ratio between ignition-chamber and compression-space and the said chamber of a shape favourable for the combustion, inadmissible stowing of heat and hereby causing overheating of some parts of the wall and of the valves being avoided. By the arrangement of oblique valves in engines of small or medium size, in which the ignition-chamber is placed in the middle of the cylinder-head, there is provided enough room, between the chamber and the valve casings cast in the cover, for the cooling water to flow through. Another sufficient cooling has been aspired by placing the main room of the ignition-chamber in the upper part of the cylinder head by shaping the chamber with an oval section, kept smaller between the valves than in right-angular horizontal sense.

These solutions are impracticable in high-pressure oil-engines with great output, in which for reasons of constructing and of manufacturing only vertical inlet- and outlet-valves are practicable with valve casings insertable from above, so that a new arrangement of ignition chamber was to be designed to which this invention relates to. The object of this improvement is to produce a sufficient cooling of the chamber walls and of the valves in ignition-chamber engines, particularly in such with valve casings inserted from above into the cylinder-head, while maintaining a shape and size of the ignition-chamber favourable for the combustion. For this purpose, said ignition-chamber is subdivided into two compartments, or more, externally cooled all around which may be separated from or connected to each other, a fuel valve being provided for each compartment.

For the working with difficultly ignitible fuel this improved arrangement permits one valve to be fed with a light fuel for inducing the ignition. Instead of this valve also a sparking plug or a like auxiliary ignition device may be provided.

I am aware that it has previously been proposed to arrange in a cylinder cover subdivided combustion-chambers, which are in free communication with the working cylinder, the fuel being supplied to said combustion-chambers, ignited therein and burnt.

According to my invention, however, in the cylinder head of an ignition-chamber motor, not the combustion-chamber itself but a fore-chamber of the same is arranged and is subdivided into two or more compartments, through which the fuel is injected without the aid of compressed-air to the compression- and combustion-chamber proper, from which said fore-chamber is separated by finely perforated atomizers and igniters per se known in the art.

This improved arrangement allows to construct compressorless high-pressure oil-motors with ignition-chambers up to the highest units and affords thus a great technical advantage above the known art.

Figure 1:
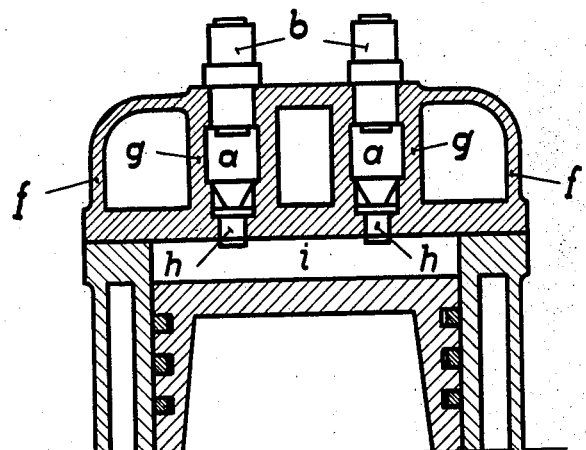
Fig. 1 is a central cross-section through a cylinder head showing two compartments or fore-chambers $a$ separate from each other which are separated from the compression chamber $i$ by finely perforated atomizers and igniters $h$ of known type fitted to each compartment at the inner part thereof. The fuel injection valves $b$ are fitted to each compartment at the outer part thereof.
Figure 2:
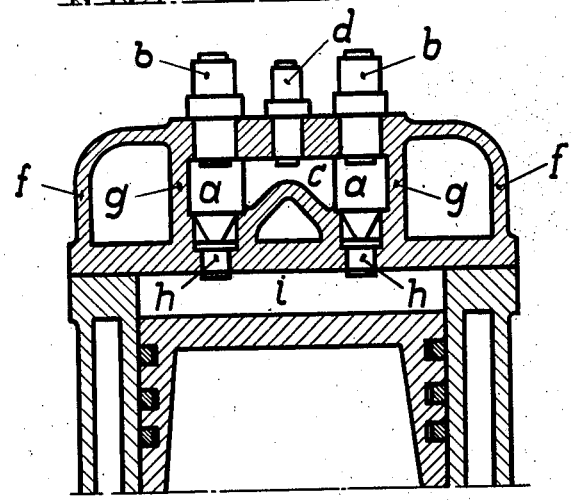
Fig. 2 is a central cross-section through an arrangement with two fore-chambers $a$ connected to each other by a communication $c$. In this arrangement also an auxiliary valve $d$ is provided besides the two normal fuel valves $b$, or a sparking plug or the like for inducing the ignition.
Figure 3:
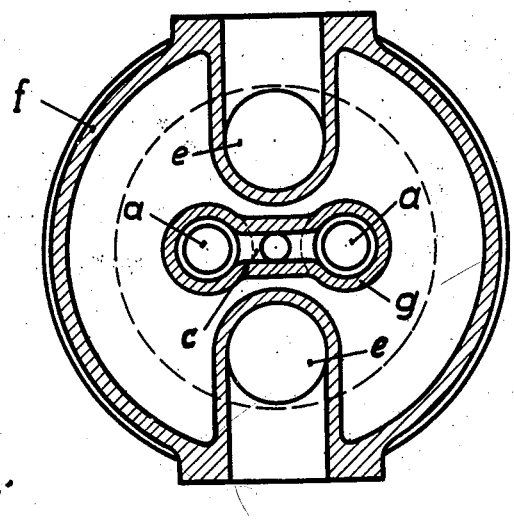
Fig. 3 is a horizontal cross-section of the cylinder-head as per Fig. 2 with the fore-chambers $a$ with communication $c$ and with both channels $e$ for the vertically disposed inlet- and outlet-valves.

These illustrations show clearly, that the ignition-chamber in the cylinder-head can be easily subdivided into two or more separate compartments $a$ with fuel supply valves, that further a complete irrigation, and thus sufficient cooling of the outer walls $g$ of said compartments as well as of the valve channels $e$ by cooling-water is possible, and that finally the whole arrangement is symmetrical, which is advantageous from the moulding and casting point of view.

What I claim is:

The combination, in an internal-combustion engine having an airless fuel injection and working by means of ignition-chambers with self-ignition, with a compression-chamber, an ignition-chamber subdivided into at least two compartments cooled all around their circumference, a finely perforated atomizer and igniter separting said ignition-chamber from said compression-chamber, and a fuel valve fitted to each of said compartments, of a communication between said compartments, and auxiliary means for inducing the ignition and fitted in said communication intermediate said fuel valves, substantially as set forth.

In testimony whereof I have hereunto set my hand.

ALFRED BARTHEL.